US006615040B1

(12) United States Patent
Benveniste

(10) Patent No.: US 6,615,040 B1
(45) Date of Patent: Sep. 2, 2003

(54) SELF-CONFIGURABLE WIRELESS SYSTEMS: SPECTRUM MONITORING IN A LAYERED CONFIGURATION

(75) Inventor: Mathilde Benveniste, South Orange, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/401,408

(22) Filed: Sep. 22, 1999

Related U.S. Application Data
(60) Provisional application No. 60/116,959, filed on Jan. 22, 1999.

(51) Int. Cl.[7] .................................................. H04Q 7/20
(52) U.S. Cl. ....................... 455/423; 455/448; 455/452; 455/454
(58) Field of Search ................................ 455/450, 452, 455/447, 423, 446, 454, 455, 63, 444, 449, 464, 426, 513, 67.1, 67.2, 448, 62

(56) References Cited

U.S. PATENT DOCUMENTS 5,282,222 A * 1/1994 Fattouche et al. .......... 375/260
5,404,574 A    4/1995 Benveniste (List continued on next page.)

OTHER PUBLICATIONS

Kinoshita et al., "High Density Space Division Multiple Access: Double Reuse of Frequncy Channels," 1994 Third Annual Int'l Conference on Universal Personal Communiccations ; Sep. 27—Oct. 1, 1994; San Diego, California; pp. 552–557.

Primary Examiner—Lester G. Kincaid
Assistant Examiner—Naghmeh Mehrpour

(57) ABSTRACT

A method and system are disclosed for coordinating RF use in primary and adjunct wireless systems which are overlapped or layered in a common geographic area and which share the same the same RF spectrum. The adjunct system includes adjunct base stations defining respective adjunct wireless cells and serving adjunct mobile stations located within the respective adjunct cell. The primary system includes primary base stations defining respective primary wireless cells and serving primary mobile stations located within the primary wireless cell. The adjunct base stations monitor all RF channels and partition them into two sets, a set of channels likely to be interference-free and a set of noisy channels. Once control channels have been assigned to the base stations, the adjunct mobile stations may also participate in the monitoring step by employing the MAHO/MACA features of the IS 136 or GSM Air Interface Standard. The adjunct system forms a pool of interference-free channels for use by all adjunct base stations and mobiles. Channels are assigned to the adjunct base stations from the interference-free set. The interference-free channels left unassigned serve as back-up channels for period replacement of the assigned channels and in case the assigned channels become noisy. A channel not being used by the adjunct system is an nonassigned channel. The spectrum monitoring procedure by the adjunct base stations for non-assigned channels measures received signal strength. If a channel has a strong signal above a predetermined threshold, then it is deemed noisy. If a channel has a weak signal strength, then the adjunct base stations must deduce the likelihood of future interference caused by activity in nearby cells in the primary system. During the operation phase, each adjunct base station, in conjunction with mobile units in its respective adjunct cell, continually monitor the channels and their classification is updated if there is a change in the background noise or in the interference signal strength indicating a change spectrum use by the primary system.

12 Claims, 3 Drawing Sheets

U.S. PATENT DOCUMENTS

| | | | |
|---|---|---|---|
| 5,581,597 A | * 12/1996 | Dent et al. | 455/450 |
| 5,708,975 A | * 1/1998 | Heiskari et al. | 455/63 |
| 5,787,352 A | 7/1998 | Benveniste | |
| 5,809,423 A | 9/1998 | Benveniste | |
| 6,018,663 A | * 1/2000 | Karlsson et al. | 455/450 |
| 6,047,176 A | * 4/2000 | Sakamoto et al. | 455/422 |
| 6,191,906 B1 | * 2/2001 | Buch | 360/51 |
| 6,212,386 B1 | * 4/2001 | Briere et al. | 455/447 |
| 6,223,031 B1 | * 4/2001 | Naslund | 455/423 |
| 6,278,881 B1 | * 8/2001 | Black | 455/444 |

* cited by examiner

SELF-CONFIGURABLE WIRELESS SYSTEMS: SPECTRUM MONITORING IN A LAYERED CONFIGURATION

This application claims priority from U.S. Provisional Application Serial No. 60/116,959, filed Jan. 22, 1999.

BACKGROUND OF THE INVENTIONS

1. Field of the Invention

The invention disclosed broadly relates to wireless communications and more particularly relates to coordinating RF use in multiple, collocated wireless systems sharing RF spectrum.

2. Related Art

The invention disclosed is related to U.S. Pat. No. 5,404,574 to Mathilde Benveniste, issued Apr. 4, 1995, entitled "Apparatus And Method For Non-Regular Channel Assignment In Wireless Communication Systems", assigned to the AT&T Corporation, and incorporated herein by reference.

The invention disclosed is also related to U.S. Pat. No. 5,809,423 to Mathilde Benveniste, issued Sep. 15, 1998, entitled "Adaptive-Dynamic Channel Assignment Organization System And Method", assigned to Lucent Technologies, Inc., and incorporated herein by reference.

The invention disclosed is also related to U.S. Pat. No. 5,787,352 to Mathilde Benveniste, issued Jul. 28, 1998, entitled "System and method for management of neighbor-channel interference with power control and directed channel assignment", assigned to the AT&T Corporation, and incorporated herein by reference.

Demand for wireless voice and data communications continues growing in all aspects of life and will soon lead to a diverse and complex mixture of cells, found in the most unpredictable RF propagation environments. Such cells may exist in layered configurations that enable greater re-use of the RF spectrum and provide continuity of communication between the cell layers. RF planning for such systems is difficult to do manually. In addition to the planning complexity, the cost of manual RF planning becomes a more substantial portion of wireless communication costs as the cost for base stations of the Wireless Centrex Service decreases. Ideally, one would want wireless systems that can self configure, and layered configurations that involve no elaborate planning and coordination of RF use between cell layers.

Easy installation and readiness for operation are features that appeal to a potential owner/operator of a wireless communication system. The ideal system is one that requires minimal information of the planner, and no tedious measurement and calibration, or even knowledge of the physical location of the base stations. Once the base stations are in place, the system would have the ability and intelligence to set base-station power levels and assign channels autonomously.

As wireless mobile communication becomes a necessary part of our lives, a wide range of public and private spaces are likely to house extensions of the conventional cellular system in the form of overlay systems. A layered configuration offers a practical way to maintain continuity between outdoor and indoor communication. Calls can be handled by the overlay system without the capacity loss penalties associated with the use of a different segment of the RF spectrum. Layered self-configurable wireless systems would have no need to communicate for the purpose of coordinating their respective RF use.

A layered configuration is a hierarchical arrangement that usually involves two systems—the primary system and the adjunct system—using the same RF spectrum. The primary system is the original owner of the spectrum. An example of a primary system is the macro-cellular system serving an urban area. The adjunct system typically covers a small area that is naturally shielded from interference from the primary system, as in the case of indoor antennas or low antennas placed on a high-traffic spot surrounded by tall buildings. Provided that the adjunct antennas' power levels are sufficiently low, interference to the primary system users will be negligible.

SUMMARY OF THE INVENTION

A method and system are disclosed for coordinating RF use in primary and adjunct wireless systems which are overlapped or layered in a common geographic area and which share the same the same RF spectrum. The adjunct system includes adjunct base stations defining respective adjunct wireless cells and serving adjunct mobile stations located within the respective adjunct cell. The primary system includes primary base stations defining respective primary wireless cells and serving primary mobile stations located within the primary wireless cell. The adjunct system monitors all RF channels and partitions them into two sets, a set of channels likely to be interference-free and a set of noisy channels. Monitoring can be performed by special monitoring sensors or by the base stations. The adjunct mobile stations may participate in the monitoring step. The adjunct system forms a pool of interference-free channels for use by all adjunct base stations. Channels are assigned to adjunct cells from the interference-free pool. The interference-free channels left unassigned serve as back-up channels in case the assigned channels become noisy. The classification of channel into interference-free and noisy and the assignment of channels to adjunct cells is carried out either by a central controller, or by intelligent base stations working cooperatively as peers.

System initialization consists of a brief calibration phase to classify all of the channels as either likely to be interference-free or to be noisy. During the initialization phase, each adjunct base station performs a series consecutive measurements of all channels both on the up-link and on the down-link frequency. The measurements have a sample size N and are periodically conducted over a testing interval. A sample of measurements of the channel is obtained over the entire adjunct system and the strongest measurement is selected. If it exceeds a specified threshold, the channel is classified as noisy. Otherwise it is deemed interference-free. The magnitude of the sample size and testing interval are based on an error probability analysis.

During system operation when adjunct base stations and mobile units are transmitting, the spectrum monitoring procedure employed depends on whether the monitored channel is currently being used by the adjunct system.

A channel used by the adjunct system is an assigned channel. The spectrum monitoring procedure for assigned channels is as follows. Assigned channels which are bearing calls are active. Active assigned channels are monitored by the adjunct base stations through the measurement of the serving signal strength and the bit-error rate. If a channel has a strong signal and a high bit-error rate, then it is deemed noisy and is replaced by a back-up channel. If a channel has a weak signal and a high bit-error rate, then a hand-off is requested to an adjacent adjunct cell. Assigned channels which are not bearing calls are inactive. Inactive assigned channels are periodically replaced by back-up channels which are monitored as non-assigned channels.

A channel not being used by the adjunct system is an nonassigned channel. The spectrum monitoring procedure for nonassigned channels is as follows. Nonassigned channels are monitored by the adjunct system through the measurement of background noise strength. If a channel has a strong background noise above a predetermined threshold, then it is deemed noisy. If a channel has a weak background noise, then the adjunct base stations must deduce the likelihood of future interference. Interference is usually caused by activity in nearby cells in the primary system. Thus, the adjunct base stations must infer the likelihood of future interference a from past activity in the primary system.

During the operation phase, each adjunct base station, in conjunction with mobile units in its respective adjunct cell, continually monitor the nonassigned channels and their classification is updated if there is a change in the background noise or in the spectrum use by the primary system. In the operation phase, sequential tests of the channel are made, wherein an analysis of the noise or interference signal strength is made after each individual measurement. If the noise or interference signal strength is detected above a specified threshold, then the channel is immediately reclassified as noisy. If a channel currently classified as noisy, has a detected noise or interference signal strength below a specified threshold, then a stopping criterion interval is checked. If the time expired since the first low-noise measurement is less than the stopping criterion interval, then a sampling of additional measurements of the channel are made before changing the classification to interference-free. The magnitude of the stopping criterion interval and the sample size for the additional measurements are based on an error probability analysis.

The resulting self-configuring system coordinates RF use in multiple, collocated wireless systems sharing the same the same RF spectrum in an improved manner.

DESCRIPTION OF THE PREFERRED EMBODIMENTS

Figure 1:
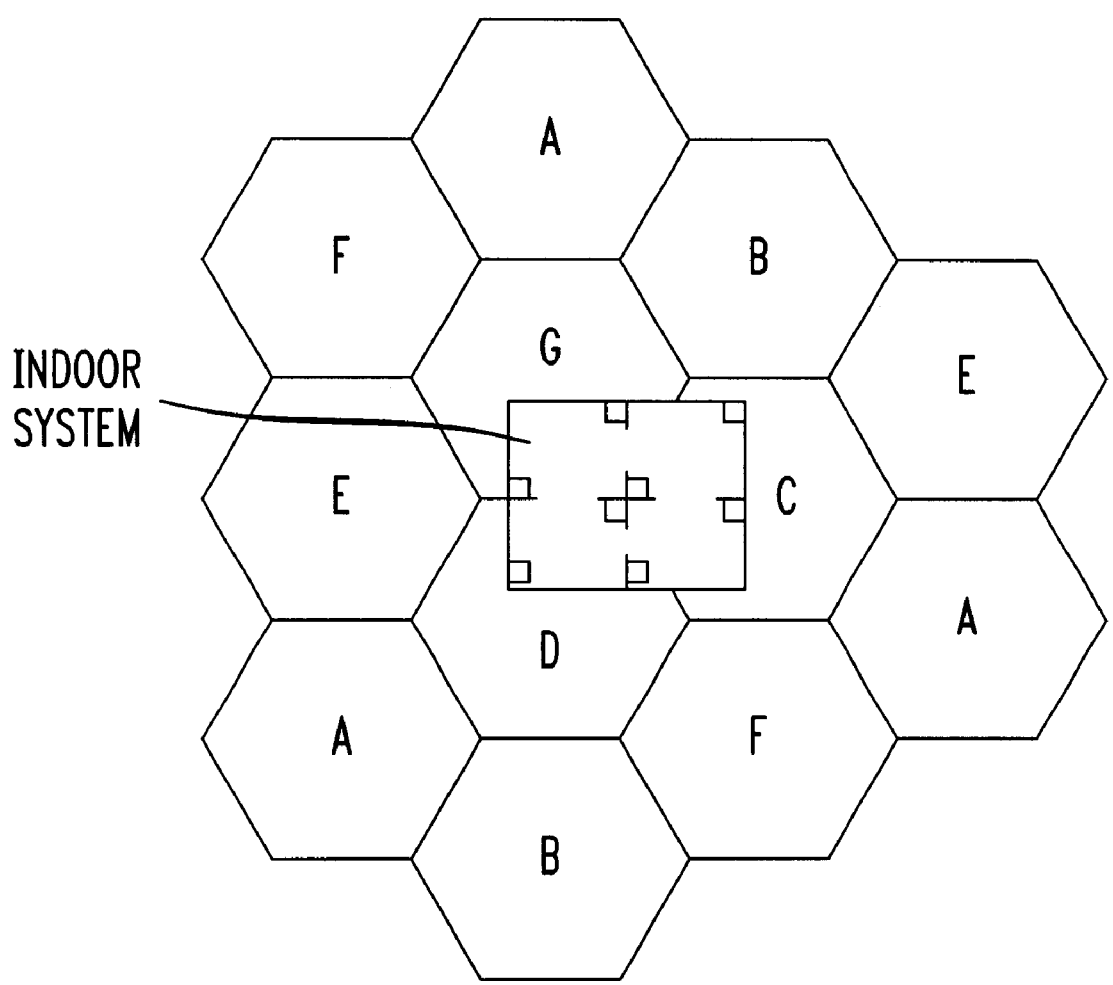
FIG. 1 shows a system diagram of an indoor wireless system within a macro-cellular system.

The type of adjunct system considered in this paper consists of several cells, highly localized within a small area that is surrounded by cells of the primary system. An example is illustrated in FIG. 1. The interference experienced by a user of such a system comes from outside the system and, if re-use is allowed, from inside as well. This is the most general form to analyze since a system of adjunct cells that are highly dispersed within a primary system could be treated simply as a collection of independent adjunct systems, each consisting of a single cell.

We are interested in the spectrum use of two systems in a layered configuration that requires no bilateral coordination, or pre-arranged partitioning of the RF spectrum. The former would impose cumbersome communication linkage requirements between the two systems, and thus add complexity to RF planning. The latter, while simple to implement, tends to reduce the call throughput attainable, not only by the primary system, but by the combined system as well. Unlike other investigators who have addressed the question of RF-spectrum sharing by layered systems, [1], [2] and [3], we make no assumptions concerning the regularity of the grid of cells of either system, and allow for the possibility that cell sizes may be mixed. No requirements are placed on the RF re-use pattern, either. RF re-use need not follow a repeat pattern and need not be known at all to the adjunct system. We are specifically interested in a primary-adjunct arrangement that leaves the call throughput of the primary system unaffected by the presence of the adjunct system. The primary system is able to use all the radio frequencies it owns, as it would be in the absence of the adjunct system. The adjunct system selects for its own use the frequencies left unused by the primary system in the immediate vicinity of the adjunct, identifying them through spectrum monitoring. Spectrum monitoring relies on signal-strength measurements. The simplest form of measurement-based spectrum monitoring would be a "sniff-and-use" procedure, whereby a channel is selected by the adjunct system if its signal strength falls below a specified threshold value. This procedure could lead to highly changeable channel assignments; something particularly undesirable in the case of control channels. We propose a more stable and efficient spectrum-monitoring procedure that benefits from learning from past data. We develop statistical quality management methods that enable an adjunct system to select its own frequencies by utilizing both present and prior signal strength measurements. Our approach assumes that the features of the IS 136 or GSM Air Interface Standard are available; but can be easily modified to apply to other air-interface standards as well.

Spectrum Monitoring

In order to maximize the stability and efficiency of RF spectrum use, the adjunct system monitors all RF channels and partitions them into two sets: the set of channels "likely" to be interference-free, and the set of noisy channels. The former may be used by the adjunct system; the latter may not. A single pool of interference-free channels is maintained for all adjunct base stations.

Channels are assigned to adjunct cells from the interference-free set. The interference-free channels left unassigned serve as back-up channels in case the assigned channels turn noisy. Channel use within the adjunct system leads to different spectrum monitoring procedures during different system phases. During system initialization—a brief self-calibration phase that requires no human participation—there are no calls served and, consequently, the users of a channel lie entirely outside the system. During system operation, when the adjunct base stations and mobile units are transmitting, signals on a channels may be generated both inside and outside the adjunct system. In this phase, the spectrum-monitoring procedure employed depends on whether the monitored channel is used by the adjunct system. We refer to a channel used by the adjunct system as an assigned channel. The non-assigned channels include both noisy channels and interference-free channels that have been reserved for back-up purposes. Monitoring non-assigned channels maintains a pool of interference-free back-up channels. Monitoring assigned channels is necessary as interference on control channels causes loss of registered mobiles and prevents new mobile registrations, while interference on traffic channels degrades the quality of communication. Active assigned channels (channels bearing calls) are monitored through measurement of the serving signal strength and the bit-error rate. If a channel that enjoys a strong serving-signal experiences high bit-error rate, it is deemed noisy and is replaced by a back-up channel. If, on the other hand, a high bit-error rate is observed on a channel with a weak serving signal, a hand-off is requested. Inactive assigned channels (channels bearing no calls) are replaced periodically by back-up channels, which are monitored as non-assigned channels. We will not deal with spectrum monitoring of assigned channels further in this specification. Our subsequent discussion pertains only to monitoring non-assigned channels during system operation and all channels during system initialization. In this specification, interference from sources outside the adjunct system is attributed either to background noise, or to the selective use of channels by the base stations and mobiles of the primary system in the vicinity of the monitoring adjunct system. For simplicity, we will assume that the background noise exhibits no random variation. Thus, when the background noise is strong, a single measurement suffices to establish the status of a channel. When, on the other hand, the background noise is low, one must deduce the likelihood of experiencing interference in the future from the channel's past utilization in nearby cells of the primary system. The problem thus becomes to determine from signal strength measurements, serving as proxies for channel-use data, the likelihood that a channel will carry primary system traffic in the vicinity of the adjunct system.

Interference-free status is ascribed to a channel based on the statistical analysis of a sequence of signal strength measurements made on that channel. The inference of future channel use from past channel usage implies the practice of some form of "fixed" allocation underlying channel assignment by the primary wireless system. Fortunately, some form of fixed channel assignment is employed typically by most macro-cellular systems. Within a small area, different channel sets are allocated for use to different primary-system cells and, consequently, a portion of the RF spectrum is not available to primary-system users in the vicinity of the adjunct system. In the example illustrated in FIG. 1, where the macro-cellular system is shown using fixed channel assignment with a re-use factor of 7, the channels in sets A, B, E, and F are not used in the immediate vicinity of the indoor wireless system shown. It is channels like these that spectrum monitoring seeks to identify and label "interference free" by analyzing channel-use data. Selecting the channels that are likely to be free of interference leads to a more stable channel assignment for the adjunct system. Channels identified through spectrum monitoring bear the adjunct base-stations' control channels. Their frequent change would require the constant updating of neighbor lists and re-registration of mobile units. Furthermore, having up-front knowledge, through spectrum monitoring, of the channels that will likely be available to the adjunct system allows for the application of more efficient channel assignment algorithms.

To summarize, the assumptions made in our analysis are the following: that background noise exhibits negligible short-term random variation and that the primary system employs fixed channel assignment. These assumptions do not preclude the possibility of changes over time in either background noise or channel use by the primary system. An evolving RF propagation environment and the application of "flexible" channel assignment [time-varying fixed channel assignment], and its variations, can be readily accommodated. Continuous spectrum monitoring during system operation tracks such changes and adjusts channel-use by the adjunct system accordingly.

Test of Hypothesis

The signal strength measurements on a monitored channel collected by the adjunct system are compared to a specified threshold level T; if above it, the corresponding channel is considered noisy. Otherwise, the likelihood that the channel will stay interference free is related to the likelihood that the channel will not carry primary-system call traffic nearby. Thus, the hypothesis must be tested that the channel has not been allocated for use to a nearby cell of the primary system. The design of the test must ensure that the probability of an erroneous conclusion is limited to a pre-specified level.

Two types of error arise in testing a hypothesis; they stem from the following two possibilities: the false rejection of the hypothesis and its false acceptance. The above hypothesis may be rejected falsely because of high background noise; the conclusion in that case is that a channel is used by the primary system, while it is not. Though technically an error in testing a hypothesis, this situation is not of concern as the ultimate goal in spectrum monitoring is to avoid noisy channels regardless of the cause of the noise.

The second type of error, which is related to the false acceptance of the hypothesis, is of concern, however. There are two possible causes of this error. One is if a channel that is assigned to the primary cell—and thus likely to be used in the future—carries no call at the time of the measurement. The second is caused by gaps in sampling: If the spacing is too long, calls may occur between consecutive measurements, and thus be missed. The acceptable level of the error associated with the false acceptance of the hypothesis will determine the parameter values used in the statistical test design.

Test Design Objectives

In addition to maintaining an error probability below a specified level, there are other criteria that enter into the design of the test procedure. These depend on the system phase.

Initialization Phase

Since there are no mobiles in the adjunct system during system initialization, spectrum-monitoring measurements are performed by the base stations. They tune to the up-link channels and measure signal-strength. If the base stations are properly equipped, they can also monitor down-link channels. Otherwise, special receivers/radios are placed at the base stations (or elsewhere in the service area of the adjunct system) for that purpose. The two types of measurements can be combined into a single sample, once adjusted to account for the difference in the power transmitted by mobiles and base stations.

Figure 2A:
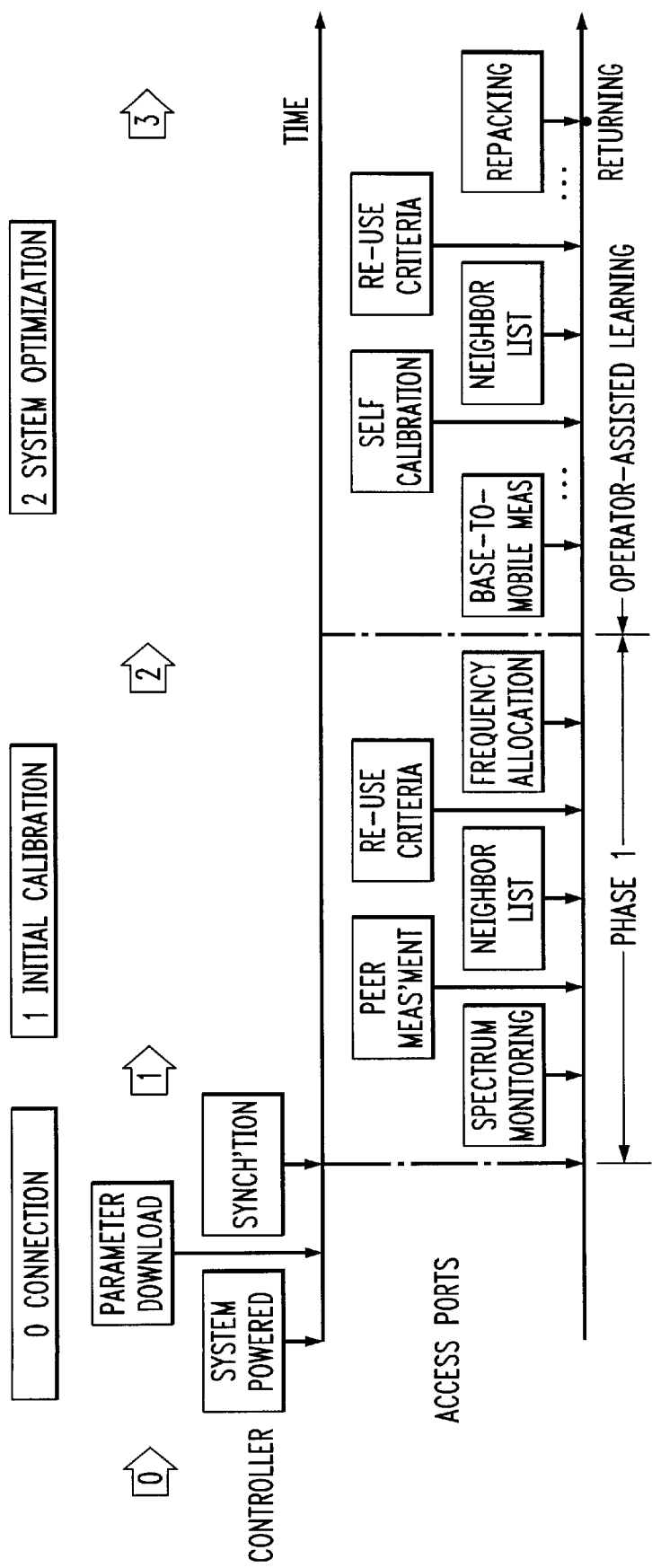
FIG. 2A shows the initialization state.

The objective during system initialization is to complete the classification of all channels in the shortest possible time so that operation may start. Since the base stations serve no calls, they are available to engage in spectrum monitoring measurements when and as needed. Measurements can thus be made at pre-specified time intervals, which are set to give a statistical sample that conforms to the test-design objective and, at the same time, maintains an error probability below a specified level. The following section on initialization phase and Test design describes the design of the test employed during system initialization. FIG. 2A shows the steps in the initialization state which includes the connection, initial calibration, and system optimization stages.

Operation Phase

The base stations and the mobiles of the adjunct system are actively engaged in calls during system operation. Unless special receivers/radios are dedicated to this end, the base station radios can be deployed to make spectrum-monitoring measurements only when they serve no calls. When idle, they tune to the monitored channel, make a signal-strength measurement, and then re-tune back to their assigned channel. As long as the time off the assigned channel is short, there would be no adverse consequences.

Mobiles also participate in spectrum monitoring, in contrast with system initialization. Using the MAHO/MACA features of the IS 136 or GSM Air Interface Standard, a list of channels to be monitored is broadcast by the serving base station. The mobiles registered to a base station measure signal strength on the specified list of channels and return the measurements. If the MAHO/MACA features are not available in the air interface standard in use, special receivers/radios are placed in the service area of the adjunct system for the purpose of making the spectrum monitoring measurements on the down-link frequencies in place of the mobiles.

Both mobile and base station measurements are necessary for effective spectrum monitoring during system operation. They each measure signal strength along the very path and at the very point where interference will be experienced. These measurements are treated as equivalent once they are adjusted for the difference in the power transmitted by mobiles and base stations.

Figure 2B:
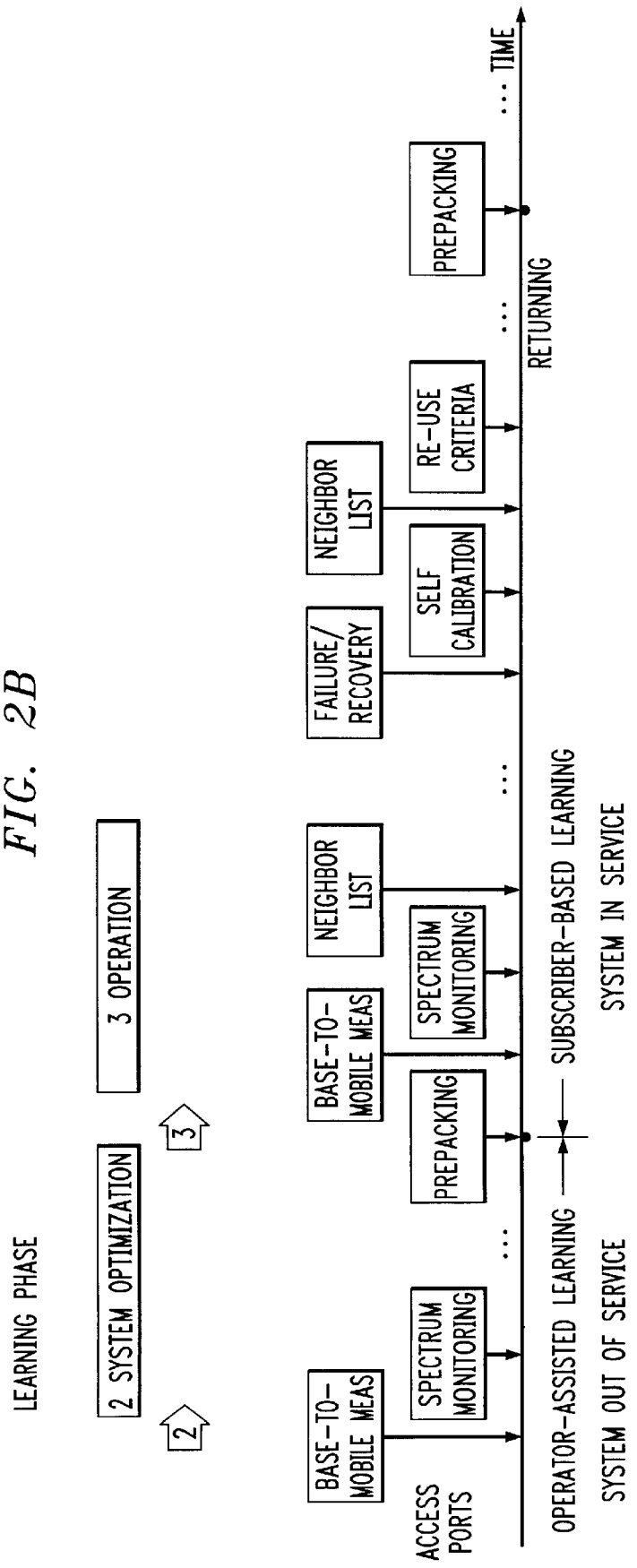
FIG. 2B shows the learning phase.

The objectives of spectrum monitoring in the two phases are different. The objective during system operation is to make as few measurements as possible because of the undesirable impact of long times off a radio's assigned channel, which would make it imprudent to engage a base station radio in spectrum monitoring excessively. Another difference relates to the random nature of the waiting times between consecutive measurements. Unlike measurements during system initialization, measurements during system operation cannot be made when and as needed; they must be made only when there are base stations and mobiles available to do so. The following section on operation and testing design describes the test employed during system operation. FIG. 2B shows the steps of the learning phase which continues from the system optimization stage and begins the operation stage.

Initialization Phase Test Design

The purpose of spectrum monitoring during system initialization is to partition the available RF spectrum into two sets: one comprising the interference-free channels and another comprising the remaining channels. The interference-free set consists of channels that are deemed interference free by all adjunct cells. A channel's classification is derived by testing the hypothesis that the channel is not allocated for use by a nearby primary-system cell. The test is the following: Obtain a system-wide sample of measurements on the channel under consideration and select the strongest measurement. If it exceeds a specified threshold level T, the channel is classified as noisy. Otherwise, it is deemed interference-free.

The sample size N and the measurement spacing $\delta$ or, equivalently, the measurement spacing $\delta$ and the test duration t are the design parameters of the test, which determine the test's error probability. We are concerned with the error made if the tested hypothesis is accepted falsely. A parameter pair ($\delta$, N) will be deemed acceptable if the resulting error probability falls below a specified level $\alpha$. Of the multitude of acceptable parameter pairs, we select the one that leads to the shortest test duration.

Error Probability Analysis

The probability, $p_E$, associated with the false acceptance of the test hypothesis is the sum of the probabilities of two disjoint events: the probability $p_0$ that no calls will occur during the test, and the probability $p_P$ that all the calls that occur during the test will fall between consecutive measurements. That is, $$p_E = p_0 + p_P \tag{1}$$

The value of $p_E$ will depend on the test duration t and on the waiting time $\delta$ between consecutive measurements. If measurements can be made at fixed time intervals, it is equivalent to specify the required number of measurements N and the sample spacing $\delta$. The relationship between the test duration t, the sample spacing $\delta$, and the sample size N in this case is the following:

$$t = (N-1)\delta \tag{2}$$

An expression for the error probability $p_E$ is obtained in terms of these design parameters as follows. If we assume Poisson call arrivals, $p_0$ is given by the following expression:

$$p_0 = e^{-\lambda t} \tag{3}$$

where $\lambda$ is the rate of call arrivals on a primary-system channel. $\lambda$ is assumed to be a known quantity.

An upper bound on the probability, $p_P$, that all calls will fall between consecutive measurements, is given by the probability that all calls will be shorter than the sample spacing $\delta$. Hence, we get the following expression:

$$p_P < \sum_{k=1}^{\infty} p_k(t) F(\delta)^k \tag{4}$$

where $p_k(t)$ is the probability that k calls occurred during a test of length t, and $F(\delta) = \Pr[d \leq \delta]$ is the probability that a call's duration d is shorter than the spacing $\delta$. Again, assuming Poisson call arrivals and a negative exponential call duration with mean $\mu^{-1}$, the expression in (4) becomes:

$$p_P < \sum_{k=1}^{\infty} \frac{e^{-\lambda t} (\lambda t)^k}{k!} (1 - e^{-\mu\delta})^k = e^{-\lambda t} \sum_{k=1}^{\infty} \frac{(\lambda t \beta)^k}{k!} \tag{5}$$

where $$\mu = 1 - e^{-\mu\delta} \tag{6}$$

$\beta$ is always positive. Since, for any non-zero number x, $$\sum_{k=1}^{\infty} \frac{x^k}{k!} = \sum_{k=0}^{\infty} \frac{x^k}{k!} - 1 \tag{7}$$

the probability $p_P$ is bounded from above as follows:

$$p_P < e^{-\lambda t} \left( \sum_{k=0}^{\infty} \frac{(\lambda t \beta)^k}{k!} - 1 \right) \tag{8}$$

Using the identity $$e^x = \sum_{k=0}^{\infty} \frac{x^k}{k!}$$

the expression in (8) becomes $$p_P < e^{-\lambda t} (e^{\lambda t \mu} - 1) \tag{9}$$

The expressions in (3) and (9) give an upper bound for the probability $p_E$ of accepting the test hypothesis falsely, which is the following:

$$p_E < e^{-\lambda t} + e^{-\lambda t}(e^{\lambda t \beta} - 1) = e^{-\lambda t}(1 + e^{\lambda t \beta} - 1) = e^{-\lambda t(1-\beta)} \tag{10}$$

Substituting the expression in (6) for , and imposing the requirement that the error probability be less than or equal to α, we have the following constraint:

$$p_E < e^{-\lambda t e^{\mu \delta}} \leq \alpha \quad (11)$$

The inequality in (11) gives the relationship that must hold between t and δ in order to maintain an error probability less than or equal to α.

A multitude of t and δ values satisfy the inequality in (11). If δ is specified, the following requirement must be met by t:

$$t \geq -\frac{e^{\mu \delta} \ln(\alpha)}{\lambda} \quad (12)$$

Alternatively, if t is given, we must find δ so that the following holds:

$$\delta \leq -\frac{1}{\mu} \ln\left[-\frac{1}{\lambda t} \ln(\alpha)\right] \quad (13)$$

The sample size N required for a pair of feasible t and δ values when all measurements occur at constant time increments is equal to the lowest integer equal to or above the value of the function N(t, δ), which is obtained by solving equation (2) for N. Specifically, it is the following:

$$N(t, \delta) = 1 + \frac{t}{\delta} \quad (14)$$

Of the multitude of t and δ values satisfying the requirement in (11), we select the pair with the shortest test duration value. A lower bound, $t_{min}$, on how short the test can be is obtained from the limit when the spacing becomes very small. The probability $p_F$ that a call would be missed as a result of measurement gaps becomes negligible. At the limit, the error probability $p_E$ would become equal to $p_0$, the probability that no calls occurred during the test duration t. Equating the expression for $p_0$ in (3) to α, we obtain the following expression for $t_{min}$:

$$t_{min} = -\frac{\ln(\alpha)}{\lambda} \quad (15)$$

$t_{min}$ represents only one lower bound on the test duration t. Other constraints may apply as well. For instance, another restriction on the test duration is related to the overall measurement process. Since all monitored channels must be measured once before repeating the measurement cycle, the waiting time $\delta_M$ between consecutive measurements on the same channel must be long enough to allow time for these measurements. The length of $\delta_M$ depends on the base-stations' hardware/firmware design that determines both the number of frequencies that can be measured at once and the duration of a measurement. The test duration $t_M$ corresponding to $\delta_M$ is given by the expression in (12), where $\delta_M$ is used for δ. The shortest feasible test duration for spectrum monitoring during system initialization is thus given by the following:

$$t = \max(t_{min}, t_M) \quad (16)$$

Given the test duration t and the corresponding sample spacing δ, the required sample size N is computed using expression (14).

Operation Phase Test Design

Channels must be classified as either interference-free or noisy at all times. Having received a classification for all channels from system initialization, the system must keep this classification current thereafter. Channels are monitored continually and a channel's classification is updated if there is change in the background noise or in the spectrum use by the primary system. Since, as assumed, the background noise does not exhibit significant short-term random variation, a single measurement suffices to establish a change in the background noise. The sample of measurements collected for spectrum monitoring is employed to test the hypothesis that the utilization by the primary system of the channel under consideration has changed in the vicinity of the adjunct system.

The test-design objective during system operation, namely, the minimization of the required number of measurements, is achieved in two different ways: First, by employing sequential analysis and, second, by selecting the target spacing between consecutive measurements on the same channel accordingly. The remainder of the specification deals with the sequential testing methods that may be employed during system operation. We present only tests involving simple arithmetic operations, in order to illustrate the versatility and ease of implementation of the proposed method for different equipment configurations.

Sequential Tests

In contrast to fixed sample-size tests, where the test is conducted after a sample of specified size has been collected, sequential analysis performs a test after every measurement. If evidence is detected in the early measurements to justify the rejection (or acceptance) of the hypothesis, there is no reason to make more measurements. Otherwise, more measurements are made.

An array of sequential tests may be designed to establish the hypothesis that the channel under consideration is no longer used by the primary system in the vicinity of the adjunct. They are all embedded in the following procedure. Each spectrum-monitoring measurement on the channel under consideration is compared to a pre-specified threshold level T, below which the channel would be deemed usable. What happens next depends both on the comparison result and on the channel's current classification. The following four possibilities exist:

A. If the channel is classified as "interference-free", and the signal is stronger than T, the channel's classification is changed to "noisy".

B. If the channel is classified as "interference-free", and the signal is weaker than T, the channel's classification remains unchanged.

C. If the channel is classified as "noisy", and the signal is stronger than T, the channel's classification remains unchanged.

D. If the channel is classified as "noisy", and the signal is weaker than T, then a stopping criterion is checked. If the stopping criterion is not met, further measurements are needed. If the stopping criterion is met, the hypothesis is accepted and the channel's classification is changed to "interference-free".

Every time Case D is revisited for a sequence of consecutive measurements, a new step of a sequential test is carried out to establish the above hypothesis. The test terminates either when the test's stopping criterion is met or when the measured signal strength exceeds the threshold value T. As during system initialization, several measurements are required because a weak signal could be explained either by a change in channel utilization, or by the absence of a call at the time of the measurement.

Spectrum-monitoring measurements in the operation phase can be made only when permitted by the availability of mobiles or base stations to make these measurements. Consequently, the time intervals between consecutive measurements i cannot be pre-specified, nor can they be made all equal. To address this issue, we describe below various sequential tests of the hypothesis tested in Case D, whose acceptance would lead to the re-classification of a noisy channel as interference free. The tests differ with respect to the stopping criterion checked when a string of consecutive measurements have all come out as described in case D above; namely, with a signal strength below the threshold value T.

Random Test

If the time of a measurement could be planned exactly, the waiting times, $\delta_i$, for i=1, ..., m, between consecutive measurements would be made constant and equal to $\delta$, as during system initialization. The design of a sequential test then reduces simply to establishing the test stopping time $t_{stop}$, or, equivalently, the stopping sample size $N_{stop}$. Given the desired error size $\alpha$, $t_{stop}$ or $N_{stop}$ are computed by expressions (12) or (14), respectively.

In the case of random waiting times between measurements, a conservative test would be obtained by ensuring that the test duration is adequate for the observed 'worst-case' spacing, which is the longest sampling interval observed during the test. This spacing would be used to compute in real time, the value of $t_{stop}$ to be employed to check the test's duration in the stopping criterion.

Each new test starts with the first signal strength measuring below T following a signal strength above T. (This situation corresponds to Case D described above.) Subsequent measurements are compared to the threshold value T and, if they fall below that value, the time elapsed since the start of the test is incremented by the waiting time $\delta_m$ between the last two measurements. That is, the time elapsed since the first of m consecutive low signal-strength measurements is the following:

$$t_m = \sum_{i=2}^{m} \delta_i \quad (17)$$

If $t_m$ exceeds $t_{stop}$, the stopping criterion has been met and the hypothesis is accepted, terminating the test. If a measurement exceeds the threshold value T, the test terminates with the rejection of the hypothesis.

Upper-bounded Test

The above approach, though conceptually simple, would involve arithmetic that may be more complex than the processors executing the computations could handle. One can get around this complexity if the measurement process enables one to restrict the longest sample spacing. That value is used to compute, in advance, the value of $t_{stop}$, a constant to be used in the stopping criterion throughout the operation phase.

Approximate Test

Alternatively, if the measurement process can be designed to aim at a specified sample spacing, but there is the possibility of small deviations from this target in either direction, an approximate test can be derived as follows. Given the desired error size $\alpha$, $t_{stop}$ and $N_{stop}$ are computed as suggested above, by expressions (12) and (14), respectively. These values are employed in a stopping criterion that checks both the test duration and the number of measurements.

Both the test duration and the number of measurements need to be checked in this case. If the stopping criterion involves only the test duration, the error probability might surpass the specified level because more calls could be missed than implied by the above calculations if the sample spacing surpasses its target value. Alternatively, if only the number of measurements were checked, the above procedure could not ensure that the channel has been monitored for an adequate period of time. Therefore, a closer approximation to the specified error probability would be attained with a stopping criterion that keeps track of both the number of measurements and the time elapsed since the start of the test.

Optimal Sample Spacing

In the above tests, where it is assumed that some degree of flexibility is afforded by the measurement procedure to achieve approximately the desired spacing between consecutive spectrum-monitoring measurements, the target value $\delta$ is selected so that it the required number of measurements is minimum. To find the smallest sample size that leads to a test error of size $\alpha$, we derive an expression for the test size $N(\delta)$, which is a function of $\delta$, and set its derivative equal to zero. This function is obtained by substituting the expression on the right hand side in (12) for t in equation (14). The result is the following:

$$N(\delta) = 1 - \frac{\ln(\alpha)e^{\mu\lambda}}{\lambda\delta} \quad (18)$$

Below is the equation derived by setting the derivative with respect to $\delta$ of the above expression for $N(\delta)$ equal to 0.

$$\frac{dN(\delta)}{d\delta} = \frac{\ln(\alpha)e^{\mu\delta}}{\lambda\delta}\left(\frac{1}{\delta} - \mu\right) = 0 \quad (19)$$

Solving for $\delta$, we get $$\delta^* = \frac{1}{\mu} \quad (20)$$

The optimal spacing is just equal to the mean call duration. This solution provides a minimum because, as it can be shown, $N(\delta)$ is pseudo-convex in $\delta$. Substituting the expression for $\delta$ given by (20) in expression (18) gives the value $N_{min}$ which is the smallest sample size that can support an error probability less than or equal to $\alpha$.

$$N_{min} = 1 - \frac{\ln(\alpha)\mu e}{\lambda} \quad (21)$$

The optimal test duration $t^*$ in this case is obtained by evaluating the right-hand side of the expression in (12) using for the value given in (20).

$$t^* = \frac{\ln(\alpha)e}{\lambda} \quad (22)$$

Hence, in order to achieve maximum sampling efficiency, spectrum monitoring measurements are targeted to occur at a spacing $\delta^*$, and the sequential test stops either at the stopping sample size of $N_{min}$ or when the test duration is greater than or equal to $t^*$.

The attainment of the optimal sample spacing selected as described above depends on hardware/firmware design considerations for the base stations, which determine the number of frequencies that can be measured simultaneously. It is also subject to the availability of base stations and mobiles to make measurements.

Numerical Examples

We illustrate by numerical examples how parameters can be selected for the statistical hypothesis tests employed for spectrum monitoring purposes.

We first consider the example where $\lambda$, the call arrival rate on the monitored channel, is 0.6 calls per minute, and the mean call duration $1/\mu$ is 1 minute. By expression (15), the test duration t must be at least 7.68 minutes, given a test size $\alpha$ level of 0.01. In order to achieve an error probability equal or below the specified $\alpha$ level, tests longer than 7.68 minutes must be considered. Expression (13) is used to obtain the maximum spacing $\delta$ required between consecutive measurements on the same channels in order to achieve an error probability equal to 0.01 or better for a specified value of t. The required number of measurements is given by equation (14).

The results appear in Table 1, where several feasible combinations are given of the number of measurements, the sample spacing, and the test duration that result in an error probability of 0.01 or less. The last two columns are expressed as multiples of the mean call duration. The data presented in this table apply to all systems with the same offered load, $\lambda/\mu$.

TABLE 1

Sample Size, Measurement Spacing, and Test Duration for $\lambda/\mu = 0.6$

| No. of Measurements N | Measurement Spacing $\delta$ (*$\mu$) | Test Duration t (*$\mu$) |
| --- | --- | --- |
| 195 | 0.04 | 8 |
| 39 | 0.26 | 10 |
| 28 | 0.45 | 12 |
| 25 | 0.60 | 14 |
| 23 | 0.73 | 16 |
| 23 | 0.85 | 18 |
| 22 | 0.96 | 20 |
| 22 | 1.05 | 22 |
| 23 | 1.14 | 24 |
| 23 | 1.22 | 26 |
| 23 | 1.29 | 28 |
| 24 | 1.36 | 30 |
| 24 | 1.43 | 32 |
| 24 | 1.49 | 34 |
| 25 | 1.55 | 36 |

We observe that, if the shortest possible test were pursued, the number of measurements would have to be large, and the sample spacing very short. The smallest feasible sample size is 22 measurements. This corresponds to measurements taken about 1 minute apart, for the example analyzed. Allowing for rounding, this result coincides with the minimum feasible sample size given by equation (21). Larger sample sizes may be necessary if the required measurements spacing cannot be realized. For instance, 25 measurements would be required if consecutive measurements could not be made less than 1.5 minutes apart.

We also consider low traffic conditions, as when $\lambda/\mu$ is 0.2. The results appear in Table 2. In the case, the test must last at least 23.03 minutes to support the same confidence level as in the example above. The smallest feasible sample size is 63 measurements, for a test lasting 60 minutes.

TABLE 2

Sample Size, Measurement Spacing, and Test Duration for $\lambda/\mu = 0.2$

| No. of Measurements N | Measurement Spacing $\delta$ (*$\mu$) | Test Duration t (*$\mu$) |
| --- | --- | --- |
| 580 | 0.04 | 24 |
| 144 | 0.20 | 28 |
| 98 | 0.33 | 32 |
| 81 | 0.45 | 36 |
| 73 | 0.55 | 40 |
| 68 | 0.65 | 44 |
| 66 | 0.73 | 48 |
| 64 | 0.81 | 52 |
| 64 | 0.89 | 56 |
| 63 | 0.96 | 60 |
| 63 | 1.02 | 64 |
| 63 | 1.08 | 68 |
| 64 | 1.14 | 72 |
| 64 | 1.19 | 76 |
| 65 | 1.25 | 80 |

A Test for a Random Sampling Interval

The tests described above assume that it is possible to control the measurement spacing during system operation. Suppose that is not so and, as a result, there is considerable variation in the waiting times $\delta_i$ between consecutive spectrum-monitoring measurements. Suppose further that m consecutive measurements resulted in signal strengths below the threshold value T. We propose an alternative sequential test that employs the statistic $w_m (\delta_2, \ldots, \delta_m)$, a function of the time intervals between consecutive measurements, that represents the likelihood of accepting the hypothesis falsely.

The following sequential procedure is repeated indefinitely:

Step 1 Measure the signal strength $S_m$ on the channel under consideration.
Step 2 If $S_m \geq T$, reject the hypothesis and terminate the test.
Step 3 Otherwise, compute $w_m$.
Step 4 For a given constant q satisfying 0<q<1, accept the hypothesis and terminate the test if $w_m$<q.
Step 5 Otherwise, make another measurement and repeat the procedure.

The constant q is determined so that the error probability is less than or equal to $\alpha$.

Error Analysis

Derivation of an expression of the statistic $w_m$ follows reasoning similar to that used earlier. Specifically, we observe that, for a given realization of $\delta_i$, i=1, ..., m, the probability that the hypothesis is accepted falsely is the sum of two probabilities: $p_0$, the probability that no calls occurred in the time interval spanned by these measurements, and $p_P$, the probability that all calls will fall between consecutive measurements.

Let the time spanned by m measurements be denoted as $t_m$. That is, $$t_m = \sum_{i=2}^{m} \delta_i \quad (23)$$

Assuming Poisson call arrivals, the probability $p_0$ is given by the following expression:

$$p_0 = e^{-\lambda t_m} \quad (24)$$

An upper bound on the probability, $p_P$, that all calls will fall between consecutive measurements is given by the probability that all calls are shorter than the longest of the sample spacing values, $\delta_{max}$. Then, we get the following expression for $p_P$:

$$p_P < \sum_{k=1}^{\infty} p_k(t_m) F(\delta_{max})^k \quad (25)$$

where $p_k(t)$ is the probability that k calls will occur in the duration t of the test; and $F(\delta)=\Pr[d \leq \delta]$, the probability that a call's duration d is shorter than the spacing $\delta$. Again, assuming Poisson call arrivals and a negative exponential call duration with mean $\mu^{-1}$, the expression in (25) becomes:

$$p_P < \sum_{k=1}^{\infty} \frac{e^{-\lambda t_m}(\lambda t_m)^k}{k!}(1 - e^{-\mu \delta_{max}})^k \quad (26)$$

The expressions in (24) and (26) give the expression for the statistic $w_m$, which is the following:

$$w_m = \sum_{k=0}^{\infty} \frac{e^{-\lambda t_m}(\lambda t_m)^k}{k!}(1 - e^{-\mu \delta_{max}})^k = e^{-\lambda t_m e^{-\mu \delta_{max}}} \quad (27)$$

The constant q must be such that the sequential test will have pre-assigned error probability equal to $\alpha$.

Provided that all of the resulting measurements are weaker than the threshold value T, the conditional acceptance region A of the sequential test is taken as comprising all combinations of sampling interval values that would lead to the acceptance of the test. Specifically, $$A = \bigcup_{m=2}^{\infty} A_m, \text{ where}$$

$$A_m = \{(\delta_1, \ldots, \delta_m): w_j(\delta_1, \ldots, \delta_j) > q, \text{ for } j=1, \ldots, m-1, w_m(\delta_1, \ldots, \delta_m) \leq q\} \quad (28)$$

Let $f(m)=f(\delta_1, \ldots, \delta_m)$ be the likelihood function of a sequence of m measurements. By expression (28), the probability of falsely accepting the hypothesis is $$p_E = \sum_{m=2}^{\infty} \int_{A_m} f(m) w_m \leq q \sum_{m=2}^{\infty} \int_{A_m} f(m) \equiv q\eta \quad (29)$$

Since $\eta$ is the probability that the times of a sequence of measurements will fall in region A, it is a non-negative number less than or equal to 1. That is, $$\eta = \sum_{m=2}^{\infty} \int_{A_m} f(m) \leq 1 \quad (30)$$

By expressions (29) and (30) then, we conclude that the error probability would be less than or equal to the-specified level a provided q is selected so that $$\alpha \leq q \leq \frac{\alpha}{\eta} \quad (31)$$

Given the statistical distribution of the sampling time intervals, the value of $\eta$ can be determined either analytically or numerically. The most conservative test is obtained for q=a.

Conclusions

We have described a spectrum monitoring procedure that enables two wireless communications systems to share RF spectrum in a layered configuration, and addressed the associated statistical quality management issues. Hypothesis tests have been proposed involving simple computations.

The objectives achieved are numerous. The proposed arrangement requires no coordination of spectrum use between the two systems and no advance partitioning of the spectrum. The primary system can use the RF spectrum the way it would have in the absence of the adjunct system. Thus, its call throughput remains unchanged, while the adjunct system can put its calls through using the same spectrum. The net result is an increase in the capacity of the combined system. Finally, the simplicity of the arithmetic operations involved in the proposed spectrum-monitoring methods makes them useful for a wide range of equipment configurations, including those with limited processing capability.

Various illustrative examples of the invention have been described in detail. In addition, however, many modifications and changes can be made to these examples without departing from the nature and spirit of the invention.

What is claimed is:

1. A method for coordinating RF use in primary and adjunct wireless systems which are layered in a common geographic area, the adjunct system shielded from interference from the primary system, and which share the same RF spectrum, wherein the adjunct system includes adjunct base stations defining respective adjunct wireless cells and serving adjunct mobile stations located within the respective adjunct cell and the primary system includes primary base stations defining respective primary wireless cells and serving primary mobile stations located within the primary wireless cell, comprising:

monitoring all RF channels by the adjunct system and partitioning unused frequencies by the primary system into two sets, a set of channels likely to be interference-free and a set of noisy channels;

forming a pool of interference-free channels for use by all adjunct base stations;

assigning channels to adjunct cells from the interference-free set;

grouping interference-free channels left unassigned as back-up channels in case the assigned channels become noisy;

during an operation phase, performing sequential tests of the channel, wherein an analysis of the noise or interference signal strength is made after each individual measurement;

if the noise or interference signal strength is detected above a specified threshold, then the channel is immediately reclassified as noisy; and if a channel currently classified as noisy has a detected noise or interference signal strength below a specified threshold, then a stopping criterion interval is checked, wherein if the time expired since the first low-noise measurement is less than the stopping criterion interval, then a sampling of additional measurements of the channel are made before changing the classification to interference-free, wherein the magnitude of the stopping criterion interval and the sample size for low signal-strength measurements are based on an error probability analysis.

2. The method of claim 1, which further comprises:

monitoring active assigned channels through measurement of the serving signal strength and the bit-error rate, and if a channel has a strong signal and a high bit-error rate, then it is classified as noisy and is replaced by a back-up channel, and if a channel has a weak signal and a high bit-error rate, then a hand-off is made to an adjacent adjunct cell;

and monitoring all assigned channels by replacing each with a back-up channel which is monitored as an nonassigned channel; and monitoring nonassigned channels through measurement of background noise strength, and if a channel has a strong background noise above a predetermined threshold, then it is classified noisy, and if a channel has a weak background noise, then determining a likelihood of interference caused by activity in nearby cells in the primary system by measurements of the channel obtained over the entire adjunct system and selecting a strongest measurement, and if it exceeds a specified threshold, then the channel is classified noisy, otherwise it is classified interference-free.

3. The method of claim 2, which further comprises:

during an initialization phase, performing a series of consecutive uplink and downlink measurements of a channel having a sample size N over a testing interval, the magnitude of the sample size and testing interval being based on an error probability analysis.

4. The method of claim 3, which further comprises:

during an operation phase, continually monitoring the channels and updating their classification if there is a change in the background noise or in spectrum use by the primary system.

5. A system for coordinating RF use in primary and adjunct wireless systems which are layered in a common geographic area, the adjunct system shielded from interference from the primary system, and which share the same RF spectrum, wherein the adjunct system includes adjunct base stations defining respective adjunct wireless cells and serving adjunct mobile stations located within the respective adjunct cell and the primary system includes primary base stations defining respective primary wireless cells and serving primary mobile stations located within the primary wireless cell, comprising:

an RF monitor in an adjunct base station monitoring all RF channels and partitioning frequencies unused by the primary system into two sets, a set of channels likely to be interference-free and a set of noisy channels;

a processor in the adjunct base station forming a pool of interference-free channels for use by all adjunct base stations;

said processor assigning channels to adjunct cells from the interference-free set;

said processor grouping interference-free channels left unassigned as back-up channels in case the assigned channels become noisy;

during an operation phase, said processor performing sequential tests of the channel, wherein an analysis of the noise or interference signal strength is made after each individual measurement;

if the noise or interference signal strength is detected above a specified threshold, then the channel is immediately reclassified as noisy; and if a channel currently classified as noisy has a detected noise or interference signal strength below a specified threshold, then a stopping criterion interval is checked, wherein if the time expired since the first low-noise measurement is less than the stopping criterion interval, then a sampling of additional measurements of the channel are made before changing the classification to interference-free, wherein the magnitude of the stopping criterion interval and the sample size for low signal-strength measurements are based on an error probability analysis.

6. The system of claim 5, which further comprises:

said RF monitor monitoring active assigned channels through measurement of the serving signal strength and the bit-error rate, and if a channel has a strong signal and a high bit-error rate, then it is classified as noisy and is replaced by a back-up channel, and if a channel has a weak signal and a high bit-error rate, then a hand-off is made to an adjacent adjunct cell, and and monitoring all assigned channels by replacing each with a back-up channel which is monitored by said RF monitor as an nonassigned channel; and said RF monitor monitoring nonassigned channels through measurement of background noise and interference signal strength, and if a channel has a strong background signal above a predetermined threshold, then it is classified noisy, and if a channel has a weak background signal, then determining a likelihood of interference caused by activity in nearby cells in the primary system by measurements of the channel obtained over the entire adjunct system and selecting a strongest measurement, and if it exceeds a specified threshold, then the channel is classified noisy, otherwise it is classified interference-free.

7. The system of claim 6, which further comprises:

during an initialization phase, said processor performing a series of consecutive measurements of a channel over the entire adjunct system having a sample size N over a testing interval, and selecting a strongest measurement, and if it exceeds a specified threshold, then the channel is classified noisy, otherwise it is classified interference-free, wherein the magnitude of the sample size and testing interval being based on an error probability analysis.

8. The system of claim 7, which further comprises:

during an operation phase, said processor continually monitoring the channels and updating their classification if there is a change in the background noise or in spectrum use by the primary system.

9. The method of claim 5, which further comprises:

said RF monitor at the adjunct base station consists of the base station receiver which is capable of tuning to both up-link and down-link frequencies.

10. The method of claim 5, which further comprises:

said processor at the adjunct base station coordinates signal strength measurements which are made by the mobile stations served by said adjunct base station, utilizing the MAHO/MACA features of the IS 136 or GSM Air Interface Standard, to be employed for spectrum monitoring purposes in conjunction with measurements made by said RF monitor located at the adjunct base station.

11. A method for coordinating RF use in primary and adjunct wireless systems which are layered in a common geographic area, the adjunct system shielded from interference from the primary system, and which share the same RF spectrum, wherein the adjunct system includes adjunct base stations defining respective adjunct wireless cells and serving adjunct mobile stations located within the respective adjunct cell and the primary system includes primary base stations defining respective primary wireless cells and serving primary mobile stations located within the primary wireless cell, comprising:

monitoring all RF channels by the adjunct system and partitioning unused frequencies by the primary system into two sets, a set of channels likely to be interference-free and a set of noisy channels;

forming a pool of interference-free channels for use by all adjunct base stations;

assigning channels to adjunct cells from the interference-free set;

grouping interference-free channels left unassigned as back-up channels in case the assigned channels become noisy;

during an operation phase, performing sequential tests of the channel at random time spacing between consecutive measurements, wherein an analysis of the noise or interference signal strength is made after each individual measurement;

if the noise or interference signal strength is detected above a specified threshold, then the channel is immediately reclassified as noisy; and if a channel currently classified as noisy has a detected noise or interference signal strength below a specified threshold, then a stopping criterion is checked, wherein if the value of a statistic that depends on the realized sampling spacing time intervals is checked and if it exceeds a specified constant, then a sampling of additional measurements of the channel are made before changing the classification to interference-free, wherein the magnitude of the stopping constant are based on an error probability analysis.

12. A system for coordinating RF use in primary and adjunct wireless systems which are layered in a common geographic area, the adjunct system shielded from interference from the primary system, and which share the same RF spectrum, wherein the adjunct system includes adjunct base stations defining respective adjunct wireless cells and serving adjunct mobile stations located within the respective adjunct cell and the primary system includes primary base stations defining respective primary wireless cells and serving primary mobile stations located within the primary wireless cell, comprising:

an RF monitor in an adjunct base station monitoring all RF channels and partitioning frequencies unused by the primary system into two sets, a set of channels likely to be interference-free and a set of noisy channels;

a processor in the adjunct base station forming a pool of interference-free channels for use by all adjunct base stations;

said processor assigning channels to adjunct cells from the interference-free set;

said processor grouping interference-free channels left unassigned as back-up channels in case the assigned channels become noisy;

during an operation phase, said processor performing sequential tests of the channel at random time spacing between consecutive measurements, wherein an analysis of the noise or interference signal strength is made after each individual measurement;

if the noise or interference signal strength is detected above a specified threshold, then the channel is immediately reclassified as noisy; and if a channel currently classified as noisy has a detected noise or interference signal strength below a specified threshold, then a stopping criterion is checked, wherein if the value of a statistic that depends on the realized sampling spacing time intervals is checked and if it exceeds a specified constant, then a sampling of additional measurements of the channel are made before changing the classification to interference-free, wherein the magnitude of the stopping constant are based on an error probability analysis.

\* \* \* \* \*